United States Patent
Iki et al.

(10) Patent No.: US 8,593,023 B2
(45) Date of Patent: Nov. 26, 2013

(54) STATOR COIL ASSEMBLY

(75) Inventors: Tomotaka Iki, Saitama (JP); Masaru Ozawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 329 days.

(21) Appl. No.: 13/110,365

(22) Filed: May 18, 2011

(65) Prior Publication Data
US 2011/0285224 A1    Nov. 24, 2011

(30) Foreign Application Priority Data

May 19, 2010   (JP) .................................. 2010-114874

(51) Int. Cl.
*H02K 9/00*   (2006.01)
(52) U.S. Cl.
USPC .............. 310/64; 310/266; 310/268; 310/208
(58) Field of Classification Search
USPC ................ 310/208, 201, 254.1, 266, 268, 64
See application file for complete search history.

(56) References Cited

U.S. PATENT DOCUMENTS

| | | | | |
|---|---|---|---|---|
| 4,484,097 A | * | 11/1984 | Kanayama et al. | 310/268 |
| 4,536,672 A | * | 8/1985 | Kanayama et al. | 310/268 |
| 5,334,898 A | * | 8/1994 | Skybyk | 310/268 |
| 8,148,870 B2 | * | 4/2012 | Iki et al. | 310/254.1 |

FOREIGN PATENT DOCUMENTS

| | | |
|---|---|---|
| JP | 2008-061375 | 3/2008 |
| JP | 2009-183072 | 8/2008 |

* cited by examiner

*Primary Examiner* — Tran Nguyen
*Assistant Examiner* — Leda Pham
(74) *Attorney, Agent, or Firm* — Squire Sanders (US) LLP (57) ABSTRACT

There is provided a compact stator coil assembly that has heat radiation increased and a cooling performance improved. A stator coil assembly includes a first coil piece, a second coil piece, and an insulating member provided with a retaining portion that catches the first coil piece and the second coil piece so that those coil pieces form a predetermined coil pattern. A coil loop is formed by the first coil piece and the second coil piece. The stator coil assembly further includes a heat-transfer member having a heat-transfer portion insulated from the first coil piece and the second coil piece and embedded in the insulating member, and a slit formed in the heat-transfer member so as to cut off the pathway of an induced current that is to flow through the heat-transfer member.

9 Claims, 10 Drawing Sheets

STATOR COIL ASSEMBLY

CROSS-REFERENCE TO RELATED APPLICATION

This application claims the foreign priority benefit under 35 U.S.C. §119 of Japanese Patent Applications No. 2010-114874 filed on May 19, 2010, the disclosures of which is incorporated herein by reference.

BACKGROUND OF THE INVENTION

1. Field of the Invention

The present invention relates to a stator coil assembly, and more particularly, to a stator coil assembly used for an axial-gap rotary electrical machine.

2. Description of the Related Art

Conventionally, regarding the stator coils of an axial-gap rotary electrical machine (an electric motor and an electric generator), there are known technologies of increasing the thickness of a conductor and of stacking the conductors in order to obtain a high torque by allowing a large current to flow therethrough.

Among such stator coils, there is a stator coil (see, for example, JP 2009-183072 A (FIG. 1, and paragraph [0003]) that cools a conductor by attaching a heat-transfer member to the surface of the conductor via an insulating sheet and by transferring heat to a cooling device provided at the inner circumference of a coil in order to prevent the conductor from producing heat by allowing a large current to flow therethrough.

Also, in order to improve the cooling performance, there is a stator coil (see, for example, JP 2008-61375 A (FIG. 6)) having cooling structures like water jackets provided at the both sides of a coil member.

Figure 10A:
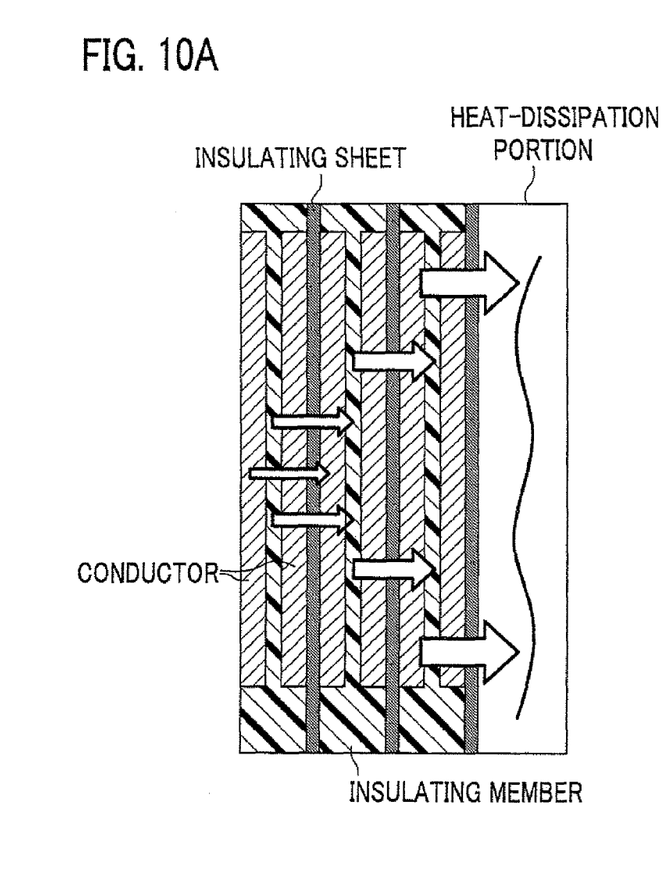
FIG. 10A is a cross-sectional view showing how heat is dissipated according to a related art, and shows a case in which a heat-radiation portion is provided at one side.
Figure 10B:
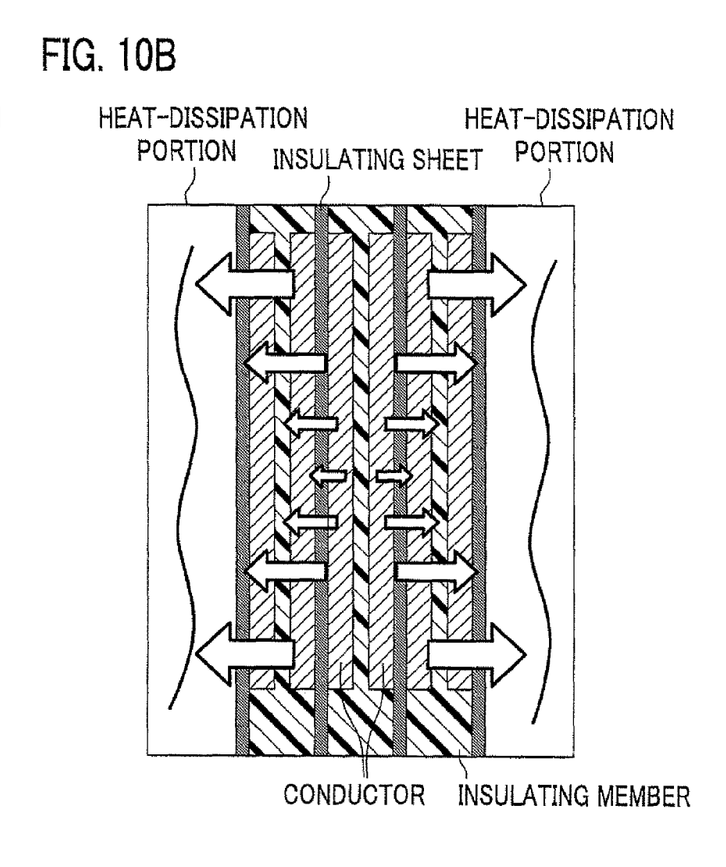
FIG. 10B is a cross-sectional view showing how heat is dissipated according to a related art and shows a case in which heat-radiation portions are provided at both sides.

However, according to the conventional stator coils, it is necessary to increase the thickness of the conductor and to stack conductors in a multilayer configuration, which result in the reduction of the heat-transfer efficiency in the thickness direction of the conductor (the axial direction of the rotary electrical machine), so that it becomes difficult to ensure a requisite heat radiation if it is attempted to obtain a high output by allowing a large current to flow through (see FIG. 10A). Also, the size of the stator coil in the axial direction increases if cooling structures are provided at both sides of a coil plate in order to enhance the cooling performance (see FIG. 10B).

SUMMARY OF THE INVENTION

The present invention has been made in view of the foregoing circumstances, and it is an object of the present invention to provide a compact stator coil assembly that has the heat radiation increased and the cooling performance improved.

In order to accomplish the above object, a first aspect of the present invention provides a stator coil assembly that includes: a plurality of first coil pieces each formed of an electrical conducting material; a plurality of second coil pieces each formed of an electrical conducting material; and an insulating member provided with retaining portions each of which catches the first coil piece and the second coil piece so that the first and second coil pieces form a predetermined coil pattern, the first coil piece and the second coil piece forming a coil loop; a heat-transfer member that includes a heat-transfer portion which is insulated from the first coil piece and from the second coil piece and which is embedded in the insulating member; and a slit formed in the heat-transfer member so as to cut off a pathway of an induced current that is to flow through the heat-transfer member.

According to this configuration, the insulation reliability is improved and the insulation is ensured since the heat-transfer portion of the heat-transfer member is embedded in the insulating member that catches the first coil piece and the second coil piece, and it becomes possible to efficiently transfer, to the heat-transfer portion that is a common heat transfer pathway, the generated heats around the first coil piece and the second coil piece (including the generated heat from e.g., a magnetic flux transfer member) when a current is allowed to flow. In this fashion, the heat-transfer efficiency and the heat radiation are increased, and thus the cooling performance can be improved by efficiently dissipating the heats collected by the heat-transfer portion and by performing cooling.

Also, since the heat-transfer portion that is the common heat transfer pathway is provided, even when coil plates forming a coil loop are stacked together in a multilayer configuration, it is possible to suppress a reduction of a heat-transfer efficiency and that of a spatial efficiency due to the stacking of the coil plates in the multilayer configuration. Therefore, the stator coil assembly is applicable to a stacking in a multilayer configuration, and has the cooling performance improved by increasing the heat radiation.

Also, since the slits that cut off the induced current are provided at the heat-transfer member that is embedded in the insulating member, the induced current originating from magnetic fluxes that interlink the heat-transfer member can be cut off. Consequently, it becomes possible to use copper, aluminum, and an alloy of these metals with a good heat conductivity as a conductive metallic material, and the heat radiation can be increased. As a result, an allowable current density of a coil can be set high, thereby obtaining a high output.

A second aspect of the present invention provides the stator coil assembly according to the first aspect of the present invention, in which the first coil piece is retained in the retaining portion formed in one of front and rear faces of the insulating member, and the second coil piece is retained in the retaining portion formed in the other one of the front and rear faces, and the heat-transfer portion is arranged between the first coil piece and the second coil piece.

According to this configuration, the insulation reliability between the first coil piece and the second coil piece can be improved by retaining the first coil piece in either the front face or the rear face of the insulating member, and by retaining the second coil piece in the other face. Also, even when a multilayer configuration having the coil plates stacked together in the thickness direction is employed, by burying the heat-transfer portion in the insulating member, it becomes possible to efficiently suppress a reduction of a heat-transfer efficiency when a large current is allowed to flow therethrough since the heat-transfer member (separately) provided for each coil loop prompts the heat radiation through each heat-transfer member.

A third aspect of the present invention provides the stator coil assembly according to the first or the second aspect of the present invention, in which the coil pieces forming the first coil piece and the second coil piece each include a middle portion defining an elongated shape of the coil piece, a first bent portion bent from one end of the middle portion in one direction of a circumferential direction of the coil loop, and a second bent portion bent from the other end of the middle portion in the other direction of the circumferential direction of the coil loop, and the coil pattern is formed in a wave winding configuration.

According to this configuration, by forming a coil pattern in a wave winding configuration, a conductor length can be designed to be a required minimum length. Also, since a conductor occupancy of the coil piece on the same plane can be increased and a large current can be efficiently allowed to flow through, a high power output can be accomplished.

A fourth aspect of the present invention provides the stator coil assembly according to any one of the first to third aspects of the present invention, in which the heat-transfer member includes a heat-radiation portion which cools heat generated by the coil loop and which is provided at an outer edge or an inner edge of the stator coil assembly, and the generated heat is transferred from the heat-transfer portion to the heat-radiation portion and cooled.

According to this configuration, by transferring the generated heat from the heat-transfer portion to the heat-radiation portion in order to perform cooling, it becomes possible to efficiently perform cooling through the heat-radiation portion with an enhanced cooling capacity. Hence, the cooling performance can be further enhanced.

A fifth aspect of the present invention provides the stator coil assembly according to the fourth aspect of the present invention, in which the heat-radiation portion includes: a circulation channel for a coolant that cools the heat; a coolant inlet that inlets the coolant into the circulation channel; and a coolant outlet that discharges the coolant from the circulation channel, and the coolant inlet and the coolant outlet are arranged at the outer edge or the inner edge of the stator coil assembly.

According to this configuration, since the coolant inlet and the coolant outlet are arranged at the outer edge or the inner edge, a connection to a coolant supply opening is enabled in an axial direction, thereby suppressing a volume increase in a radial direction.

A sixth aspect of the present invention provides the stator coil assembly according to the fourth aspect of the present invention, in which the slit is formed at either the outer edge or the inner edge where no heat-radiation portion is provided.

According to this configuration, by forming the slits in the edge where no heat-radiation portion is provided, the pathway of the induced current can be cut off.

A seventh aspect of the present invention provides the stator coil assembly according to the fourth aspect of the present invention, in which the heat-radiation portion is provided at an outer edge of the heat-transfer member, and the slit is formed at an inner edge of the heat-transfer member.

According to this configuration, a capacity for the heat-radiation portion can be easily secured since the heat-radiation portion is provided at the outer edge, and non-circulation of heats is prevented since the heats are transferred from the inner edge to the outer edge. Therefore, the heat-transfer efficiency can be enhanced and the heat radiation can be improved.

An eighth aspect of the present invention provides the stator coil assembly according to the seventh aspect of the present invention, in which the heat-transfer member includes the slit which is formed in a comb-teeth shape so that the outer edge of the heat-transfer member is continuous in the circumferential direction and which is provided with an opening running from the outer edge to the inner edge and cutting off the induced current at the inner edge.

According to this configuration, by employing a comb-teeth shape that has a simple configuration, the productivity is improved, and the number of production steps can be reduced. Also, since the outer edge is continuous in the circumferential direction, when the heat-radiation portion is provided at the outer edge, a heat-transfer area can be increased so that the heat-transfer efficiency can be improved.

A ninth aspect of the present invention provides the stator coil assembly according to any one of the first to third aspects of the present invention, in which the slit includes an inner-edge-side slit provided with an opening which runs from the outer edge of the heat-transfer member to the inner edge thereof and which cuts off the induced current at the inner edge, and an outer-edge-side slit provided with an opening which runs from the inner edge to the outer edge and which cuts off the induced current at the outer edge, the inner-edge-side slit and the outer-edge-side slit being alternately formed in the circumferential direction.

The slit according to the present invention can be in various forms as long as it can cut off the induced current, and the slits at the inner edge side and the slits at the outer edge side may be alternately provided.

DETAILED DESCRIPTION OF THE PREFERRED EMBODIMENT

A detailed explanation will be given of a stator coil assembly 1 according to an embodiment of the present invention with reference to the accompanying drawings.

Figure 1A:
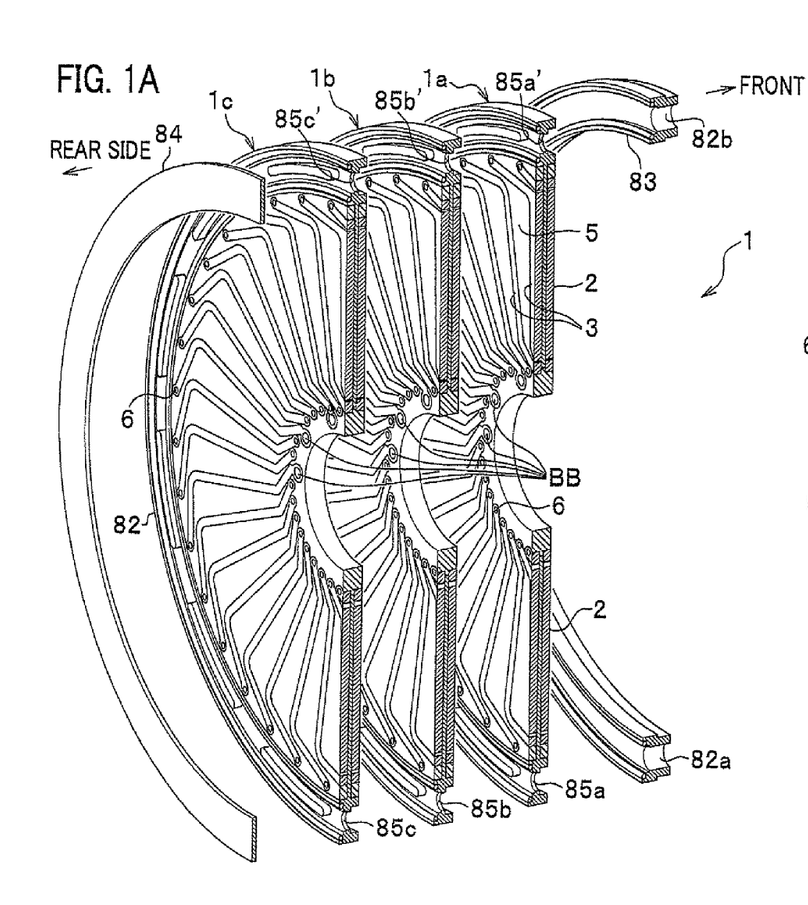
FIG. 1A is a perspective view showing a stator coil assembly according to the present invention in a half-cut state and shows three-layer coil plates separated.
Figure 1B:
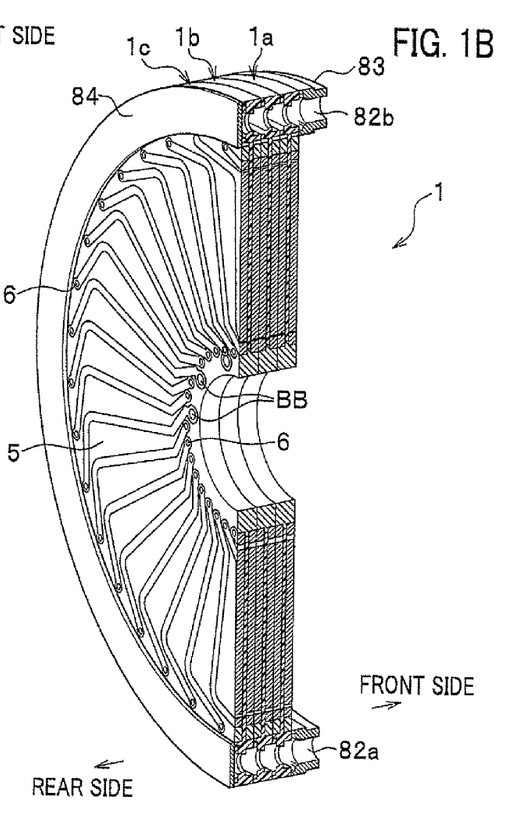
FIG. 1B is a perspective view showing the stator coil assembly according to the present invention in a half-cut state and shows the three-layer coil plates assembled.

As shown in FIG. 1, the stator coil assembly 1 is in a flat annular shape, and includes three-layer coil plates 1a, 1b, and 1c which are a first coil plate 1a, a second coil plate 1b, and a third coil plate 1c stacked together in a thickness direction. Also, the stator coil assembly 1 has a heat-radiation portion 82 (see FIGS. 6A and 6B) arranged at the outer edge of the stator coil assembly 1 in the circumferential direction, and the heat-radiation portion 82 includes a coolant-inletting ring 83 and a coolant sealing cover 84. Also, a coolant inlet 82a and a coolant outlet 82b are formed in the coolant-inletting ring 83.

In order to simplify the explanation, the first-coil-plate-1a side where the coolant inlet 82a and the coolant outlet 82b are present is referred to as a front side of the stator coil assembly 1, and the third-coil-plate-1c side is referred to as a rear side. In the same way, although regarding respective coil plates 1a, 1b, and 1c, a front side and a rear side are defined in some cases, the present invention is not limited with respect to defined front side and rear side.

The configurations of the three-layer coil plates 1a, 1b, and 1c will be explained, but since the three-layer coil plates 1a, 1b, and 1c have the same configuration, the first coil plate 1a will be mainly explained below with reference to FIG. 2A to FIG. 4. FIG. 2A to FIG. 4 are perspective views for explaining the configuration of the first coil plate.

The three-layer coil plates 1a, 1b, and 1c, each form unillustrated three-phase coil loops: a U phase; a V phase; and a W phase, and each have power-feeding connecting terminals BB (see FIGS. 1A and 1B), but since the three-phase coil loops have the same configuration, in order to simplify the explanation, only one phase will be selected and explained below.

As shown in FIGS. 2A to 3B, the first coil plate 1a includes first coil pieces 2 (see FIG. 2B) arranged at the front side, second coil pieces 3 (see FIG. 2B) arranged at the rear side, an insulating member 5 (see FIG. 2B) having recesses 4 which are retaining portions of retaining respective first coil pieces 2 and second coil pieces 3 so as to insulate the first coil piece and the second coil piece from each other, joining pins 6 (see FIG. 3A and FIG. 4) each of which is an interlayer joining member that joins the first coil piece 2 and the second coil piece 3 together in order to let a current to flow therethrough, a heat-transfer member 8 which has heat-transfer portions 81 that are embedded in the insulating member 5 and which also has a heat-radiation portion 82 (see FIG. 2A), and slits 81a which are formed in the heat-transfer member 8 and which cut off an induced current.

Figure 2A:
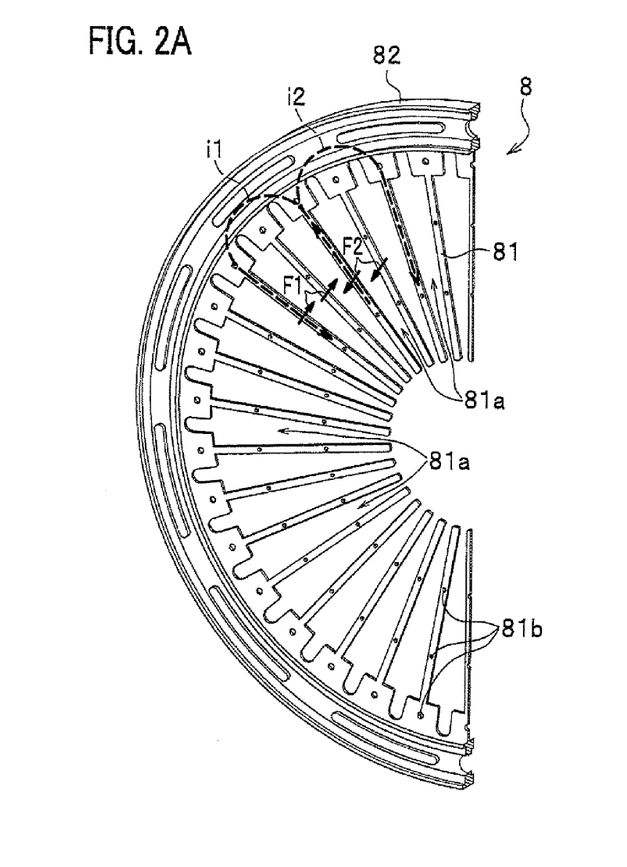
FIG. 2A is a perspective view showing a first coil plate according to the present invention in a half-cut state and shows a configuration of a heat-transfer member.
Figure 2B:
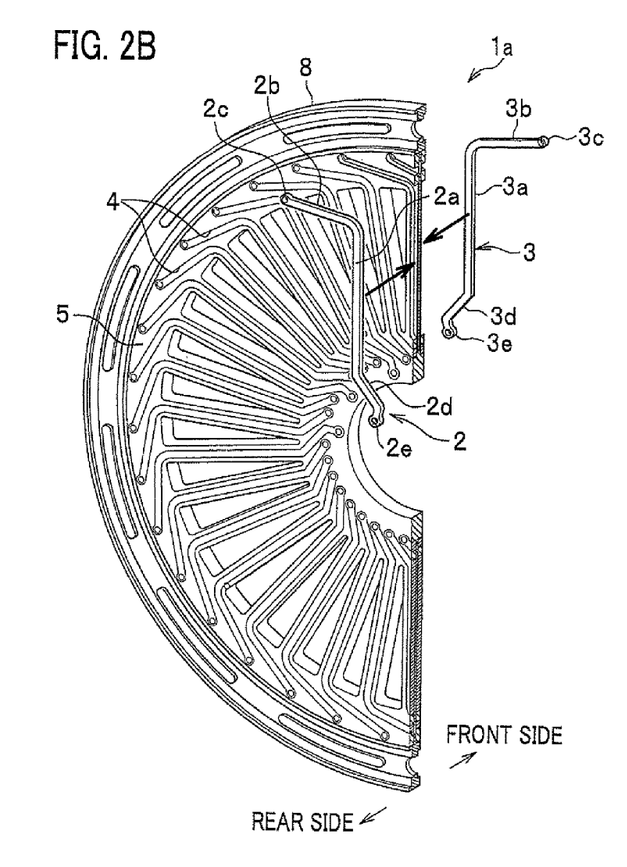
FIG. 2B is a perspective view showing the first coil plate according to the present invention in a half-cut state and is an exploded view of coil pieces separated from the first coil plate.
Figure 4:
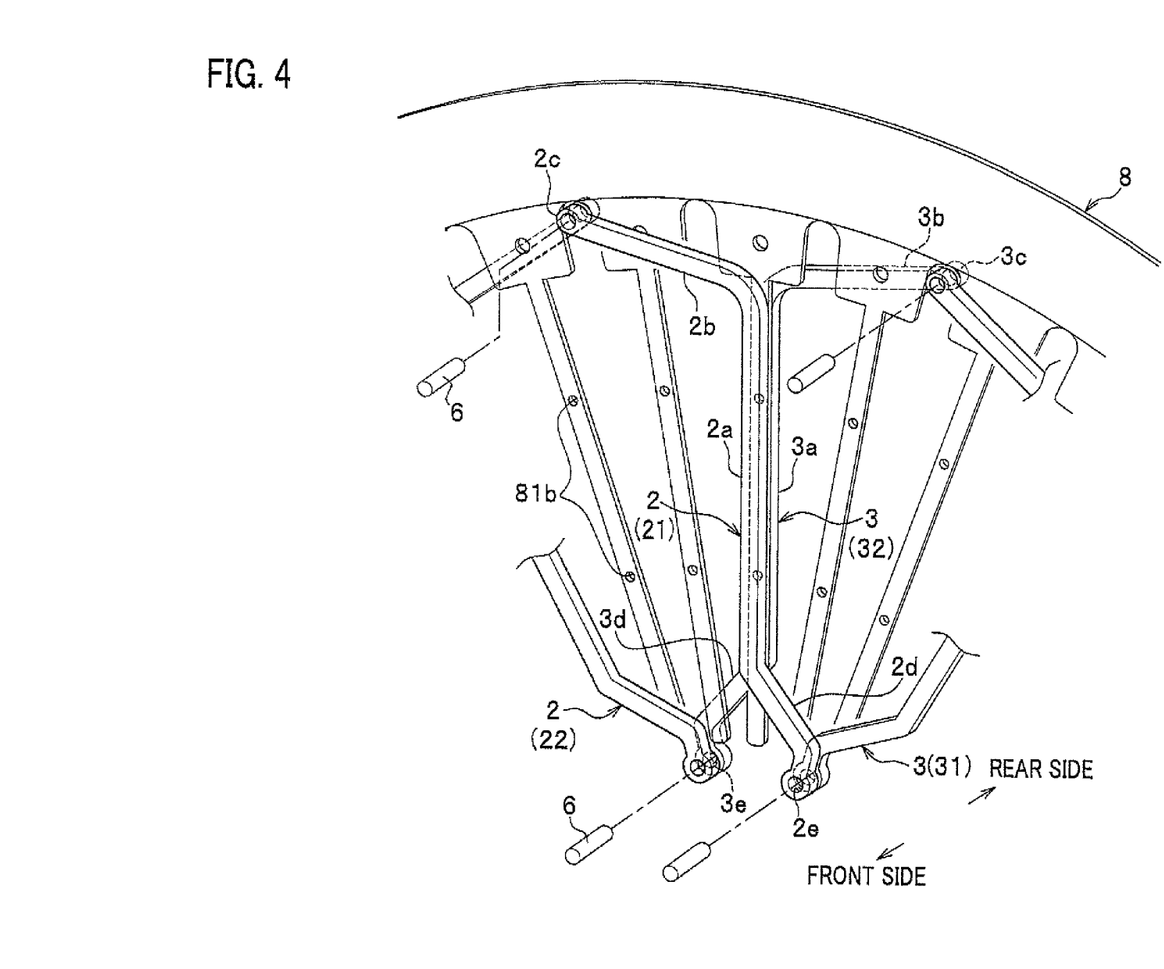
FIG. 4 is an exploded perspective view for explaining how to superimpose a first coil piece and a second coil piece according to the present invention.

As shown in FIG. 2B, the first coil piece 2 is retained and fitted in the recess 4 formed in one face (a front face) of both faces of the insulating layer 5, and the second coil piece 3 is retained and fitted in the recess 4 (not shown) formed in the other face (the rear face) of both faces (see FIG. 1A and also FIG. 4). As shown in FIG. 2B, the recesses 4 are grooves formed in a shape that matches the shape of a coil piece which is the first coil piece 2 or the second coil piece 3.

Although a retaining portion is the recess 4 in this embodiment, the present invention is not limited to this configuration, and the first coil piece 2 and the second coil piece 3 may also be retained by being struck into a convex portion or a wall portion, or by being fitted in a convex portion or a boss portion.

Figure 3A:
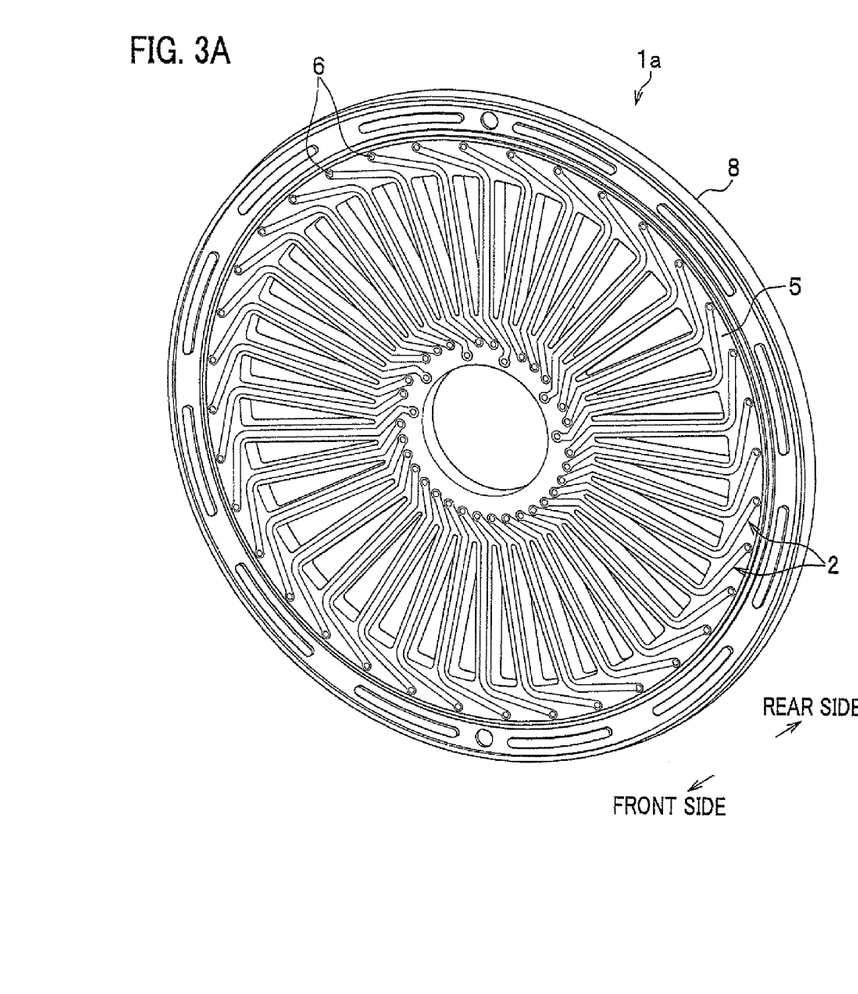
FIG. 3A is a diagram showing a configuration of the first coil plate according to the present invention, and is a plan view.
Figure 3B:
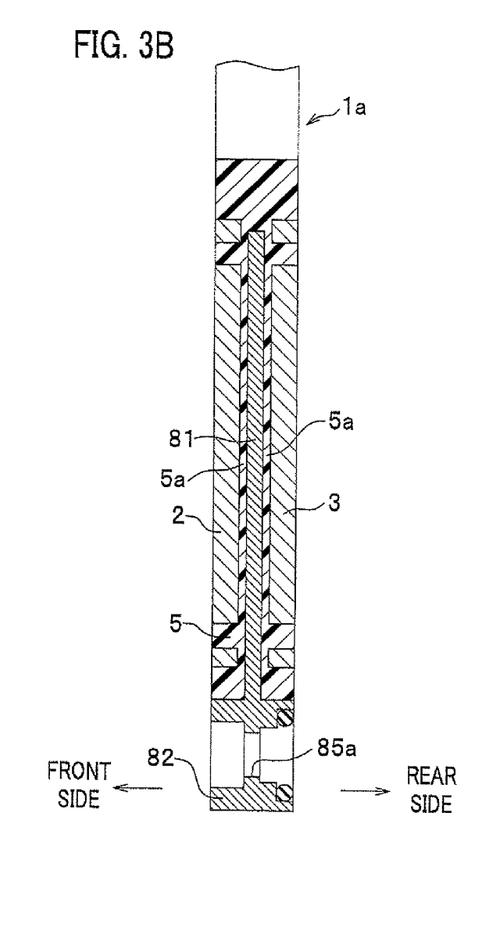
FIG. 3B is a diagram showing a configuration of the first coil plate according to the present invention, and is a cross-sectional view.

The first coil piece 2 is formed of aluminum, aluminum alloy, copper, or copper alloy, each of which is an electrical conducting material, and as shown in FIG. 4, the first coil piece 2 includes a middle portion 2a formed in an elongated shape, a first bent portion 2b bent from one end (an outer edge side) of the middle portion 2a in a direction (a counterclockwise direction) of the circumferential direction of a coil loop CR (see FIG. 5), a first joining hole 2c formed in the leading end of the first bent portion 2b, a second bent portion 2d bent from the other end (an inner edge side) of the middle portion 2a in the other direction (a clockwise direction) of the circumferential direction of the coil loop CR, and a second joining hole 2e formed in the leading end of the second bent portion 2d (see FIGS. 3A and 3B).

Figure 5:
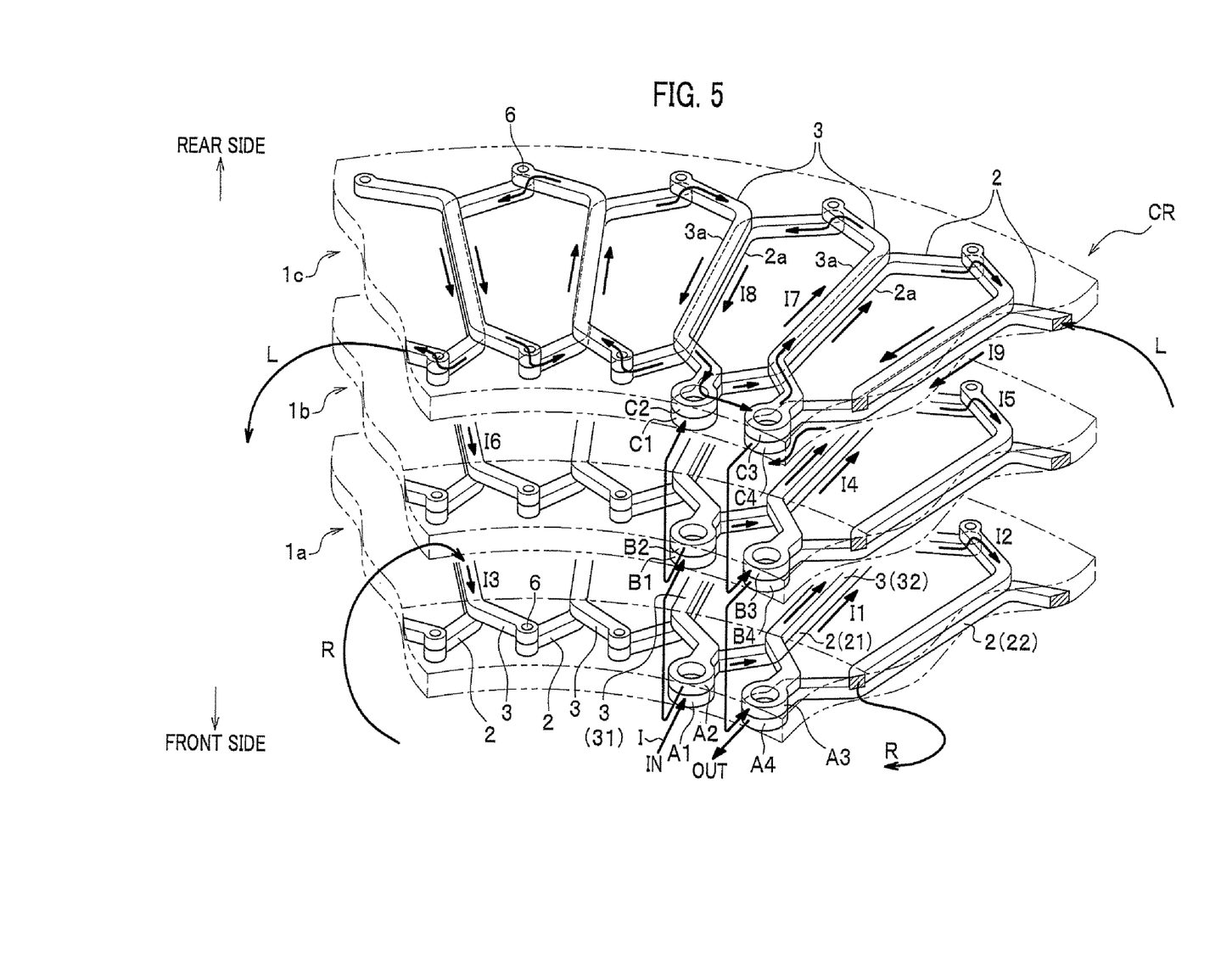
FIG. 5 is an exemplary perspective view for explaining how an electric current flows through a coil loop according to the present invention.

Also, each first coil piece 2 includes a coil piece 21 having a power-feeding input terminal A1 and a coil piece 22 having a powering output terminal A4 (see FIG. 5).

The second coil piece 3 is formed of aluminum, aluminum alloy, copper, or copper alloy, each of which is an electrical conducting material, and is formed in the same shape as that of the first coil piece 2, but as shown in FIG. 4, in a front-rear relationship relative to the first coil piece 2 in a state in which the second coil piece is retained in the insulating member 5. Therefore, the first coil piece 2 and the second coil piece 3 are arranged in the front recess 4 and the rear recess 4 (not shown) respectively so as to be symmetrical as viewed from the front of the figure. In order to simplify the explanation, the insulating member 5 (see FIG. 2B) is omitted in FIG. 4, in order to make the rear side visible.

Also, each second coil piece 3 includes coil pieces 31 and 32 each having a connecting terminal A2 and a connecting terminal A3, that are connected to the second coil plate 1B (see FIG. 5).

That is, as shown in FIG. 4 and as viewed from the front side of the figure, the second coil piece 3 includes a middle portion 3a formed in an elongated shape, a first bent portion 3b bent from one end (an outer edge side) of the middle portion 3a in a direction (a counterclockwise direction) of the circumferential direction of a coil loop CR (see FIG. 5), a first joining hole 3c formed in the leading end of the first bent portion 3b, a second bent portion 3d bent from the other end (an inner edge side) of the middle portion 3a in the other direction (a clockwise direction) of the circumferential direction of the coil loop CR, and a second joining hole 3e formed in the leading end of the second bent portion 3d.

As shown in FIG. 4, the first coil piece 2 and the second coil piece 3 are arranged so that the middle portion 2a of the first coil piece 2 and the middle portion 3a of the second coil piece 3 are arranged on the front face and the rear face, respectively, so as to overlap in the radial direction with the insulating member 5 (omit illustrating) being sandwiched therebetween, the first joining hole 2c and the second joining hole 3c overlap and are joined together by the joining pin 6 at the outer edge, and the second joining hole 2e and the second joining hole 3e overlap and are joined together by the joining pin 6 at the inner edge.

In this fashion, the coil loop CR (see FIG. 5) is formed by the first coil piece 2 and the second coil piece 3 which are joined together by the joining pin 6.

In this embodiment, although the first coil piece 2 and the second coil piece 3 are joined together by the joining pin 6, the present invention is not limited to this configuration. For example, it is also possible to form a joining portion which joins these coil pieces together at the first coil piece 2 or the second coil piece 3, or to arrange the coil piece inserted in the insulating member 5 beforehand.

As shown in FIGS. 3A and 3B, the insulating member 5 is in an annular discoidal shape and is formed of an insulating material like a synthetic resin, has the heat-transfer portions 81 of the heat-transfer member 8 (see FIG. 2A) embedded in the insulating member so as to cover the heat-transfer portions, and insulates the first coil piece 2, the second coil piece 3, and the heat-transfer member 8 from one another (see FIG. 2B).

The recesses 4 (see FIG. 2B) which catch respective first coil pieces 2 are formed in the front face of the insulating member 5 at predetermined intervals, and the recesses 4 (not shown) which catch respective second coil pieces 3 are also formed in the rear face of the insulating member 5 at predetermined intervals.

It is desirable that the material of the insulating member 5 in which the heat-transfer member 8 is embedded should be selected from materials having a reliable dielectric strength and a higher heat-transfer efficiency. It is also desirable that insulating layers 5a (see FIG. 7) provided between the first and second coil pieces 2 and 3 and the heat-transfer member 8 should be designed so as to be as thin as possible from the standpoint of the heat-transfer efficiency.

As a production method of covering the heat-transfer member 8 so as to be embedded in the insulating member 5, a so-called insert molding method, in which molding is performed by allowing the molten insulating member 5 to flow with the heat-transfer member 8 being inserted in a resin mold, is suitable. According to the insert molding method, the heat-transfer member 8 can be firmly and stably held in the insulating member 5 by forming anchor holes 81b (see FIG. 2A) in the heat-transfer member 8.

As described above, as shown in FIG. 5, the coil loop CR is formed by joining the first coil piece 2 and the second coil piece 3 together through the joining pin 6 (see FIG. 4) in each of the three-layer coil plates 1a, 1b, and 1c like the first coil plate 1a, and by coupling the three-layer coil plates 1a, 1b, and 1c together through respective connecting terminals A1 to A4, B1 to B4, and C1 to C4.

As shown in FIG. 2A, the heat-transfer member 8 is formed of copper, aluminum, and an alloy of these metals with a good heat conductivity, and is formed in an annular discoidal shape. Also, the heat-transfer member 8 includes the heat-transfer portions 81 that are ribs formed radially, the slits 81a formed in respective heat-transfer portions 81, and the heat-radiation portion 82 which transfers heat transferred from the heat-transfer portions 81 to a coolant CL (see FIGS. 6A and 6B) in order to perform cooling.

As described above, since the heat-transfer portions 81 are formed in a rib configuration, the heat-transfer portions 81 can effectively transfer heat generated from the first coil piece 2, the second coil piece 3, and a magnetic flux transfer member (not shown) arranged therearound to the heat-radiation portion 82.

The heat-transfer portion 81 can suppress a generation of an eddy current even if conducting materials, such as copper, aluminum, or an alloy of these metals with a good heat conductivity are used since the heat-transfer portion 81 has the slits 81a which are formed so as to be spaced apart at the inner edge in the circumferential direction and to be continuous in the circumferential direction at the heat-radiation portion 82 that is the outer edge. Hence, by using a conducting material having a good heat conductivity to the heat-transfer member 8, the stator coil assembly 1 is realized which can obtain a high output by increasing the density of magnetic fluxes while increasing the heat radiation and enhancing the cooling performance.

That is, as shown in FIG. 2A, induced currents i1 and i2 are generated at the heat-transfer member 8 due to a change in magnetic flux caused by the flowing current through a coil loop and a change in magnetic flux caused by the rotation of an unillustrated rotor magnet. The induced currents i1 and i2 attempt to flow in a direction of interrupting respective changes in magnetic fluxes F1 and F2 flowing through the unillustrated rotor, but since the heat-transfer member 8 generates heat when the induced currents i flow, and decreases a torque characteristic. Hence, the slits 81a which are spaced apart in the circumferential direction of the inner edge are formed so as to cut off the flow of the induced currents i.

The slit 81a is in a triangular shape having a width becoming wide from the inner edge toward the outer edge. Consequently, unillustrated magnetic flux transfer members each formed of a ferromagnetic material are inserted in the centers of respective slits 81a in order to efficiently transfer the magnetic fluxes F1 and F2 to the unillustrated rotor with the magnetic flux transfer members being spaced apart in the circumferential direction at the inner edge.

Figures 6A, 6B:
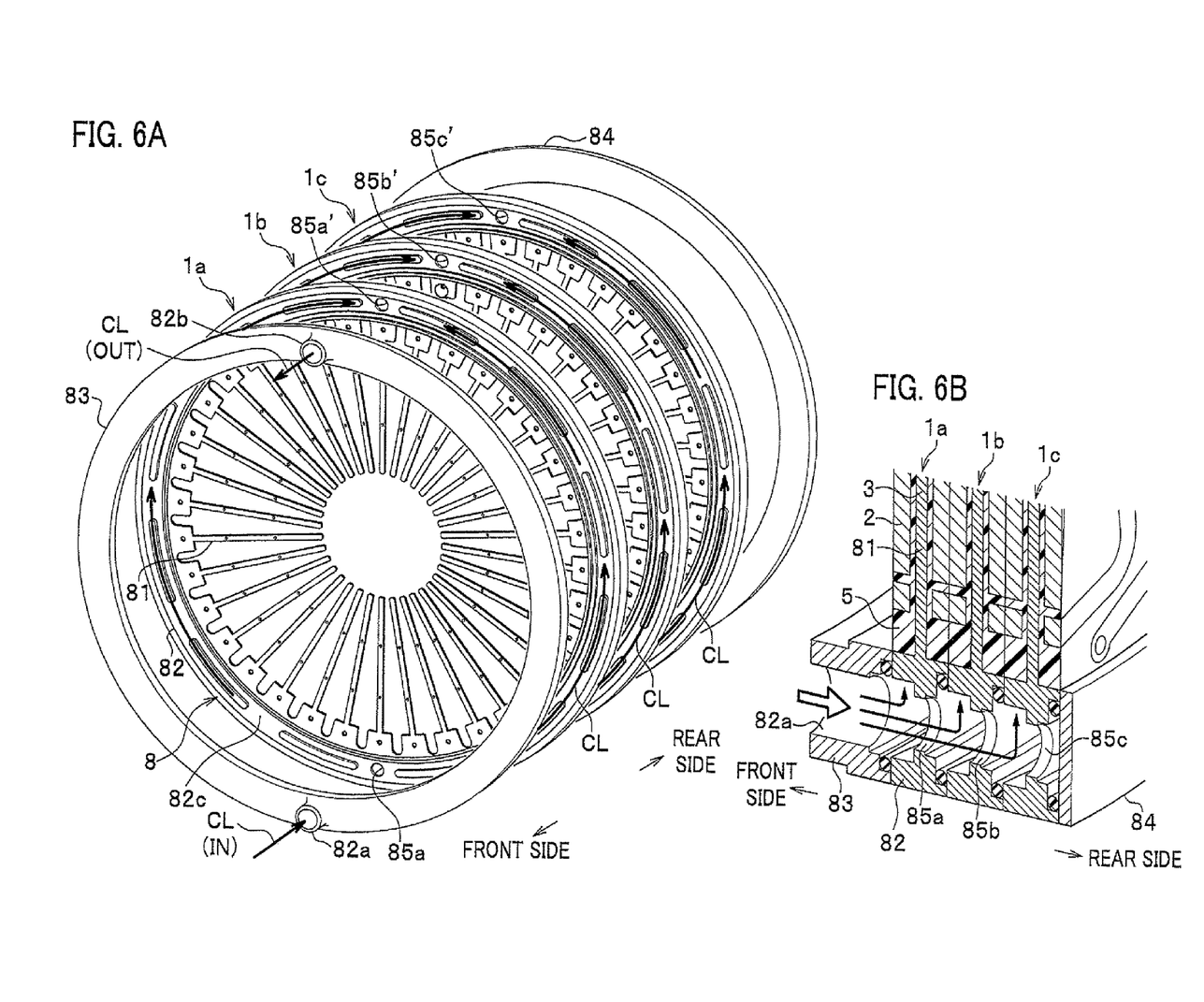
FIG. 6A is an exploded perspective view for explaining how a coolant is caused to circulate by the heat-transfer member according to the present invention.
FIG. 6B is an exploded perspective view for explaining how a coolant is caused to circulate by the heat-transfer member according to the present invention.

As shown in FIG. 6A, the heat-radiation portion 82 includes a circulation channel 82c for the coolant CL which is formed in the outer edge of the heat-transfer member 8, the coolant inlet 82a that supplies the coolant CL to the circulation channel 82c from an unillustrated coolant supplying device, and the coolant outlet 82b that discharges the coolant CL from the circulation channel 82c and returns the coolant to the coolant supplying device. The coolant inlet 82a and the coolant outlet 82b are arranged at locations opposite to each other in the outer edge.

Even if the coolant inlet 82a and the coolant outlet 82b are not arranged at the locations opposite to each other, air can be bled with a simple configuration which arranges, for example, the coolant inlet 82a below the coolant outlet 82b.

According to this configuration, as shown in FIG. 6A, the coolant CL inlet into the coolant inlet 82a flows through a through hole 85a formed in the outer edge of the first coil plate 1a and in an opposite direction along the circumferential direction of the front and rear faces of the outer edge, and flows to an opposite side of the outer edge by 180 degrees.

Likewise, the coolant flows through through holes 85b and 85c formed in respective outer edges of the second coil plate 1b and the third coil plate 1c in an opposite direction along the circumferential direction of the front and rear faces of the outer edge, and flows to the opposite side of the outer edge by 180 degrees.

Next, a current flow through the coil loops CR in a wave winding configuration formed by the three-layer coil plates 1a, 1b, and 1c will be explained with reference to FIG. 5.

A current I input (IN) into the power-feeding input terminal A1 of the first coil plate 1a shown in the lower stage (the front side) in the figure alternately passes through the joining pins 6 such as from the first coil piece 2 (I1) in the lower stage in the figure to the second coil piece 3 (I2) in an upper stage (the rear side) in the figure, circulates (I3) in a clockwise direction R (I3), and is guided to the connecting terminal A2.

Since the connecting terminal A2 and a connecting terminal B1 of the second coil plate 1b are connected together by means of an unillustrated connecting washer, the current I guided to the connecting terminal A2 circulates (I4 to I6) in a clockwise direction like the first coil plate 1a in the second coil plate 1*b*, and is guided to a connecting terminal B2. Likewise, the current I circulates in a clockwise direction from a connecting terminal C1 in the third coil plate 1*c* and is guided to a connecting terminal C2.

Also, since the connecting terminal C2 of the third coil plate 1*c* and a connecting terminal C3 thereof are connected together by means of an unillustrated connecting washer, the current I guided to the connecting terminal C2 alternately passes through the joining pins 6 in the third coil plate 1*c* in this case such as from the second coil piece 3 (I7) to the first coil piece 2 (I8), circulates in a counterclockwise direction L (I9), and is guided to a connecting terminal C4.

Since the connecting terminal C4 and a connecting terminal B3 of the second coil plate 1*b* are connected together by means of an unillustrated coil washer, the current I guided to the connecting terminal B3 circulates in a counterclockwise direction in the second coil plate 1*b* like the third coil plate 1*c*, and is guided to a connecting terminal B4. Likewise, the current I guided from the connecting terminal B4 to a connecting terminal A3 circulates in a counterclockwise direction from the connecting terminal A3, reaches a powering output terminal A4, and is output (OUT) from the powering output terminal A4.

In this fashion, since a current flows in clockwise and counterclockwise directions in respective three-layer coil plates 1*a*, 1*b*, and 1*c*, a current flows in the same direction (in directions toward the outer edge and toward the inner edge) through the middle portion 2*a* of the first coil piece 2 and the middle portion 3*a* of the second coil piece 3, so that the magnetic fluxes have the same direction and are synthesized so that the magnetic fields are mutually enhanced.

Figure 8:
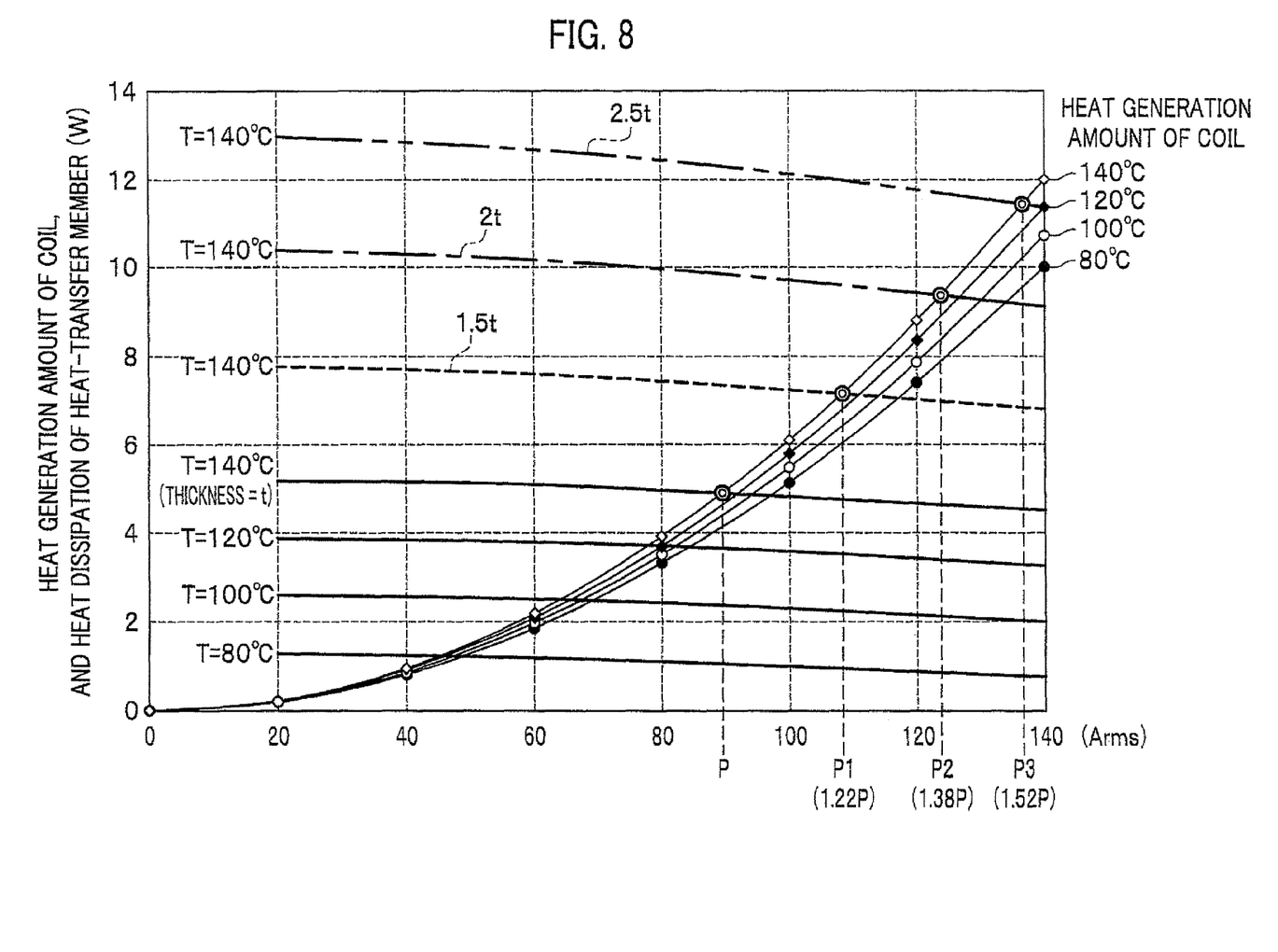
FIG. 8 is a diagram showing a relationship among the thickness of the heat-transfer member, a heat radiation, and an allowable torque according to the present invention.

Next, a relationship among the thickness of the heat-transfer portion 81 (see FIG. 2A), a heat radiation thereof, and the current value of a coil will be explained with reference to FIG. 8. FIG. 8 is a diagram showing a relationship among the thickness of the heat-transfer portion 81, the heat radiation thereof, and the current value of the coil with the vertical axis representing the heat generation amount of the coil and the heat radiation (W) of the heat-transfer member 8 and the horizontal axis representing the current value (Arms) of the coil.

The specification of the stator coil assembly 1 according to an embodiment of the present invention is designed depending on the intended application and the output characteristics of a rotary electrical machine to which the stator coil assembly is applied, but the heat radiation can be adjusted accordingly by changing a thickness t of the heat-transfer portion 81.

That is, when an average temperature T of the coil is increased from 80° C. to 100° C., to 120° C., and to 140° C. with the thickness of the heat-transfer portion 81 being as t, the heat generation amount of the coil increases like a quadratic curve together with the increase of the current value of the coil, and the heat generation amount of the coil increases by substantially 20% at 140° C. (12 W) in comparison with at 80° C. (10 W). That stator coil assembly is designed so that the heat-transfer member 8 (see FIG. 2A) dissipates heats by what corresponds to the heat generation amount of the coil to make a condition thermally balanced.

For example, when the average temperature of the coil is set to be 140° C., and the thickness of the heat-transfer portion 81 is changed from the reference thickness t to 2.5 t, the heat radiation of the heat-transfer member 8 is approximately 5.1 to 4.8 W at the reference thickness t, becomes approximately 7.8 to 6.9 W at 1.5 t, becomes approximately 10.2 to 9.2 W at 2 t, and becomes approximately 13 to 11.5 W at 2.5 t.

Therefore, if the heat generation amount of the coil and the heat radiation of the heat-transfer portion 81 are made in a thermally balanced condition at 140° C., when the current value of the coil at the thickness t of the heat-transfer portion 81 is a reference current value P, it becomes 1.22 P at 1.5 t, 1.38 P at 2 t, and 1.52 P at 2.5 t. As explained above, since the stator coil assembly 1 can freely change the heat radiation only by changing the thickness of the heat-transfer portion 81, it is possible to carry out thermal designing in accordance with the specification (the heat generation amount) of a motor.

An action of the stator coil assembly 1 configured as explained above will be explained with mainly reference to FIGS. 6A to 7.

As shown in FIGS. 6A and 6B, the coolant CL inlet from the coolant inlet 82*a* flows to an opposite side of the outer edge by 180 degrees, passes through through holes 85*c*', 85*b*', and 85*a*' (see FIG. 6A) formed in the opposite side of the outer edge by 180 degrees, is discharged from the coolant outlet 82*b*, and returns to the unillustrated coolant supplying device. Also, that coolant transfers, from the heat-transfer portion 81 to the heat-radiation portion 82, the generated heats of the first coil piece 2, the second coil piece 3, and the unillustrated magnetic flux transfer member therearound when a current is allowed to flow through the coil plates in order to perform cooling.

Consequently, the stator coil assembly 1 has the heat-transfer efficiency and the heat radiation increased, thereby having the cooling performance improved by efficiently dissipating the heat collected by the heat-transfer portion 81 and by performing cooling.

Also, the insulating member 5 in which the heat-transfer member 8 is embedded is selected from materials having a reliable dielectric strength and a high heat-transfer efficiency, and the insulating layers 5*a* (see FIG. 7) located between the first and second coil pieces 2 and 3 and the heat-transfer member 8 is designed so as to be thin as much as possible, so that a high heat-transfer efficiency is ensured.

Figure 7:
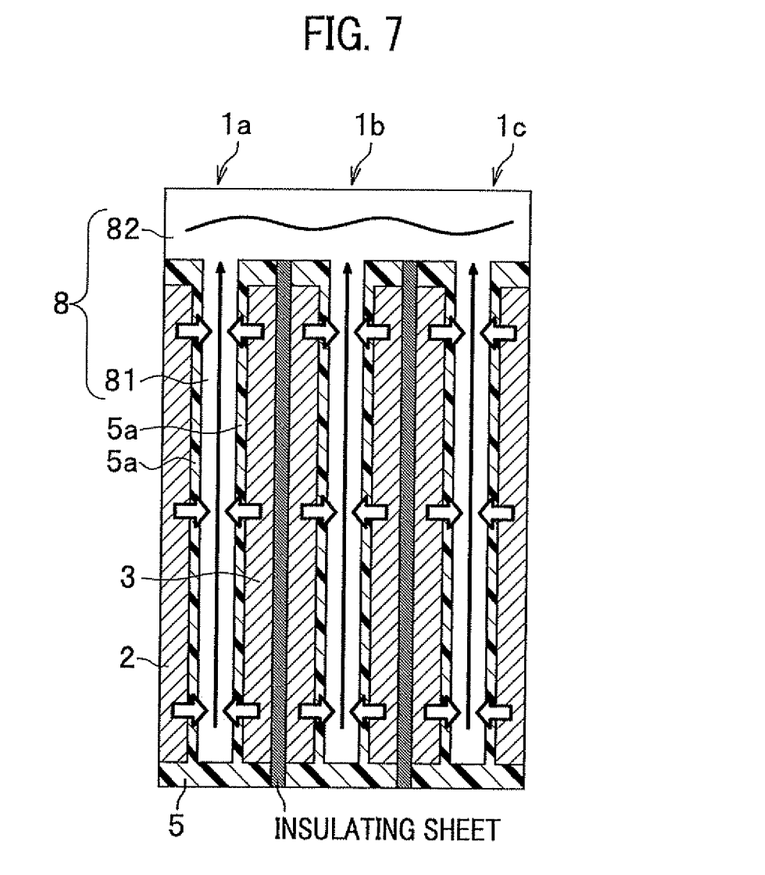
FIG. 7 is an exemplary cross-sectional view for explaining how heat is dissipated by the heat-transfer member according to the present invention.

Therefore, as shown in FIG. 7, since the heat-transfer portion 81 that is the common heat transfer path is embedded in the insulating member 5 in order to ensure the high heat-transfer efficiency, even when the coil plates 1*a*, 1*b*, and 1*c* forming the coil loops CR (see FIG. 5) are stacked together in a multilayer configuration, heats can be transferred to the heat-radiation portion 82 through respective heat-transfer portions 81 of the coil plates 1*a*, 1*b*, and 1*c*. Accordingly, it is possible to suppress a reduction of a heat-transfer efficiency and of a spatial efficiency inherent to the stacking in the multilayer configuration. Therefore, the stator coil assembly 1 is applicable to a stacking in a multilayer configuration, and has the cooling performance improved by increasing the heat radiation.

The embodiment of the present invention was explained above, but the present invention is not limited to the foregoing embodiment, and can be changed and modified in various forms as needed.

Figure 9A:
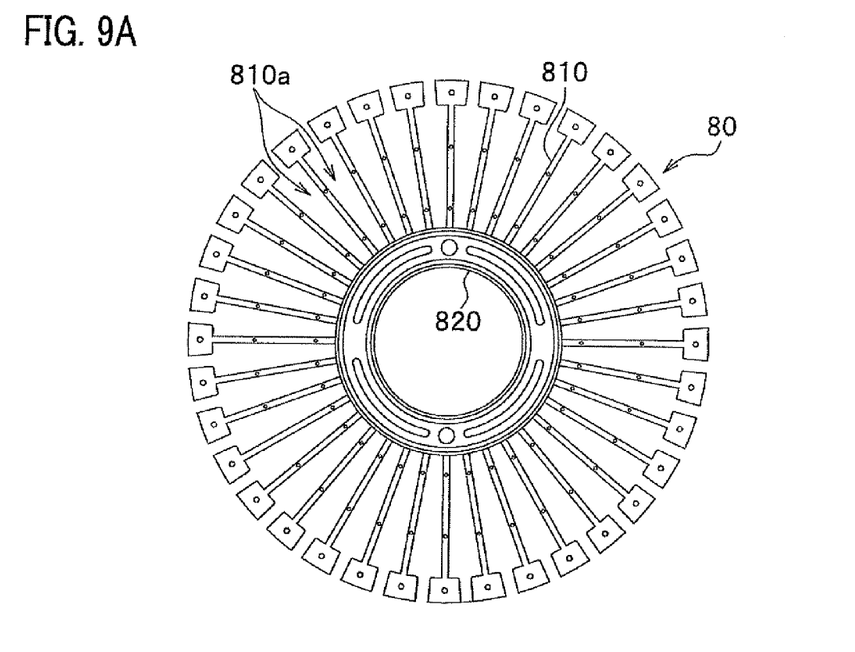
FIG. 9A is a perspective view for explaining a modified example of the heat-transfer member according to the present invention, and shows a heat-radiation portion arranged at an inner edge.

For example, in the above-explained embodiment, the heat-radiation portion 82 is arranged around the outer edge of the heat-transfer member 8, and the slits 81*a* that cut off an induced current are formed in the inner edge (see FIG. 2A), but the present invention is not limited to this configuration. As shown in FIG. 9A, a heat-radiation portion 820 may be arranged at the inner edge of a heat-transfer member 80, and slits 810*a* (induced current cut-off slits) that cut off an induced current may be formed around the outer edge.

Figure 9B:
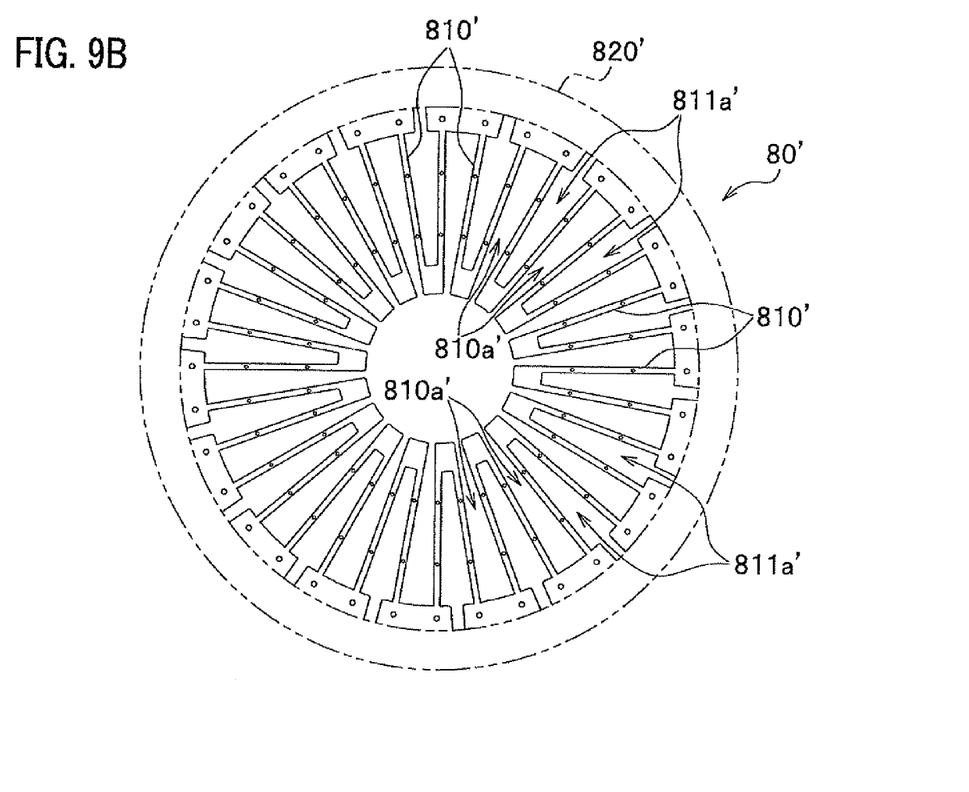
FIG. 9B is a perspective view for explaining the modified example of the heat-transfer member according to the present invention, and shows slits formed in a zigzag manner from an inner edge to an outer edge.

Also, as shown in FIG. 9B, the induced current cut-off slits of a heat-transfer member 80' may be slits 810*a*' and 811*a*' which alternately have the slits 810*a*' and the slits 811*a*' formed in a zig-zag pattern from the inner edge to the outer edge. The slit 810a' has an opening (a separating portion) which runs from the outer edge of the heat-transfer member 80' to the inner edge thereof and which cuts off an induced current at the inner edge, and the slits 811a' has an opening (a separating portion) which runs from the inner edge to the outer edge and which cuts off the induced current at the outer edge.

That is, it is possible to change respective layouts and shapes of a heat-radiation portion 820' of the heat-transfer member 80' and the slits 810a' and 811a' thereof which cut off the induced current depending on the specification of the rotary electrical machine.

Although a coil pattern in a wave winding configuration is used in this embodiment, the present invention is not limited to this configuration, and regarding the shape of a coil piece and the coil pattern thereof, various forms can be employed depending on the specification of the rotary electrical machine.

Also, the coolant CL is circulated through the heat-radiation portion 82 in order to perform cooling in this embodiment, but the present invention is not limited to this configuration, and the cooling capacity of the heat-radiation portion 82 is designed appropriately depending on the specification of the rotary electrical machine to be used. An air-cooling device which has no particular cooling mechanism and which prompts natural heat radiation may be used.

What is claimed is:

1. A stator coil assembly comprising:
    a plurality of first coil pieces each formed of an electrical conducting material;
    a plurality of second coil pieces each formed of an electrical conducting material; and
    an insulating member provided with retaining portions each of which catches the first coil piece and the second coil piece so that the first and second coil pieces form a predetermined coil pattern, the first coil piece and the second coil piece forming a coil loop,
    wherein the stator coil assembly further comprises:
    a heat-transfer member that includes a heat-transfer portion which is insulated from the first coil piece and from the second coil piece and which is embedded in the insulating member; and
    a slit formed in the heat-transfer member so as to cut off a pathway of an induced current that is flowed through the heat-transfer member.

2. The stator coil assembly according to claim 1, wherein the first coil piece is retained in the retaining portion formed in one of front and rear faces of the insulating member, and the second coil piece is retained in the retaining portion formed in the other face, and
    the heat-transfer portion is arranged between the first coil piece and the second coil piece.

3. The stator coil assembly according to claim 1, wherein the coil pieces forming the first coil piece and the second coil piece, respectively are each in a wave winding configuration, and each include a middle portion defining an elongated shape of the coil piece, a first bent portion bent from one end of the middle portion to one direction of a circumferential direction of the coil loop, and a second bent portion bent from the other end of the middle portion in the other direction of the circumferential direction of the coil loop.

4. The stator coil assembly according to claim 1, wherein
    the heat-transfer member includes a heat-radiation portion which cools heat generated by the coil loop and which is provided at an outer edge or an inner edge of the stator coil assembly, and
    the generated heat is transferred from the heat-transfer portion to the heat-radiation portion and cooled.

5. The stator coil assembly according to claim 4, wherein the heat-radiation portion includes:
    a circulation channel for a coolant that cools the heat;
    a coolant inlet that inlets the coolant into the circulation channel; and
    a coolant outlet that discharges the coolant from the circulation channel, and
    the coolant inlet and the coolant outlet are arranged at locations opposite to each other in the outer edge or the inner edge of the stator coil assembly.

6. The stator coil assembly according to claim 4, wherein the slit is formed at either the outer edge or the inner edge where no heat-radiation portion is provided.

7. The stator coil assembly according to claim 4, wherein the heat-radiation portion is provided at an outer edge of the heat-transfer member, and the slit is formed at an inner edge of the heat-transfer member.

8. The stator coil assembly according to claim 7, wherein the heat-transfer member includes the slit which is formed in a comb-teeth shape so that the outer edge of the heat-transfer member is continuous in the circumferential direction and which is provided with an opening running from the outer edge to the inner edge and cutting off the induced current at the inner edge.

9. The stator coil assembly according to claim 1, wherein the slit includes an inner-edge-side slit provided with an opening which runs from the outer edge of the heat-transfer member to the inner edge thereof and which cuts off the induced current at the inner edge, and an outer-edge-side slit provided with an opening which runs from the inner edge to the outer edge thereof and which cuts off the induced current at the outer edge, the inner-edge-side slit and the outer-edge-side slit being alternately formed in the circumferential direction.

* * * * *